United States Patent [19]
Martin

[11] 3,964,022
[45] June 15, 1976

[54] HAND-HELD SCAN DATA HANDLING SYSTEM

[75] Inventor: Charles E. Martin, Roswell, N. Mex.

[73] Assignee: Recognition Equipment Incorporated, Irving, Tex.

[22] Filed: Apr. 18, 1975

[21] Appl. No.: 569,692

Related U.S. Application Data

[63] Continuation of Ser. No. 431,376, Jan. 7, 1974, abandoned.

[52] U.S. Cl. ............... 340/146.3 J; 235/61.11 E; 340/146.3 SY; 340/146.3 H
[51] Int. Cl.² ......................................... G06K 9/12
[58] Field of Search ............ 340/146.3 SY, 146.3 H, 340/146.3 AC, 146.3 Z, 146.3 J, 146.3 R; 235/61.11 E

[56] References Cited
UNITED STATES PATENTS

| | | | |
|---|---|---|---|
| 3,187,306 | 6/1965 | Rabinow | 340/146.3 H |
| 3,238,501 | 3/1966 | Mak et al. | 340/146.3 SY |
| 3,587,047 | 6/1971 | Cutaia | 340/146.3 H |
| 3,593,287 | 7/1971 | Kobayashi et al. | 340/146.3 J |
| 3,613,080 | 10/1971 | Angeloni et al. | 340/146.3 AC |
| 3,744,025 | 7/1973 | Bilgutay | 340/146.3 Z |
| 3,761,876 | 9/1973 | Flaherty et al. | 340/146.3 H |

*Primary Examiner*—Leo H. Boudreau
*Attorney, Agent, or Firm*—Richards, Harris and Medlock

[57] ABSTRACT

Optically reading and processing alphanumeric data using a hand-held wand by passing a two-dimensional array of photosensitive elements horizontally along a line of data to be read. An optical image of the data is focused upon the array to produce digitized outputs which are thresholded to produce a one bit binary code indicating black cells and white cells. A subset of the binary quantities are combined in terms of black segments and white voids to form a plurality of character images while simulating vertical movement of the subset with character recognition attempted upon each simulated increment of vertical movement.

36 Claims, 18 Drawing Figures

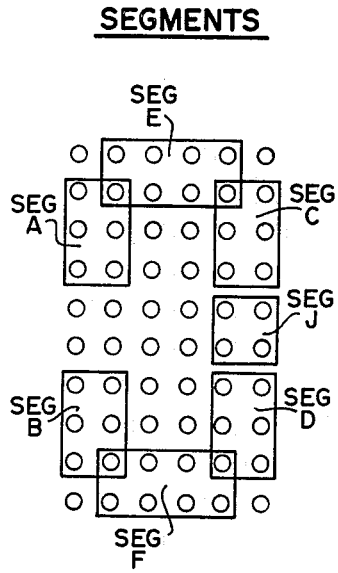
SEGMENTS
FIG. 9a
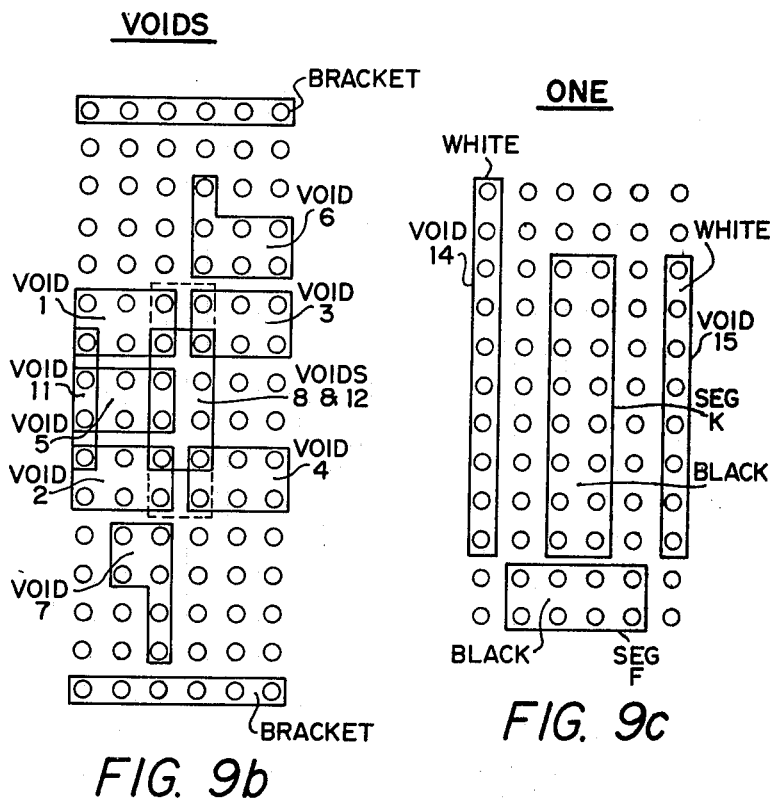
VOIDS
FIG. 9b
ONE
FIG. 9c
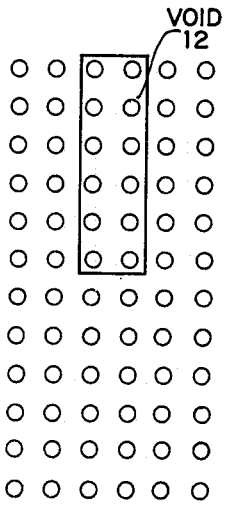
FOUR
FIG. 9d
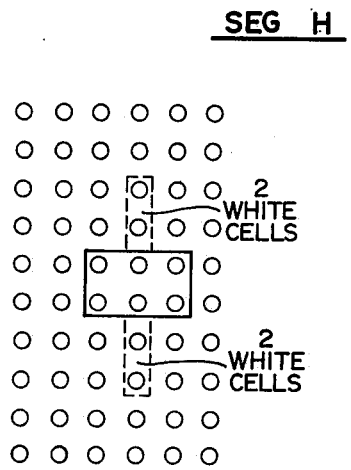
SEG H
FIG. 9e
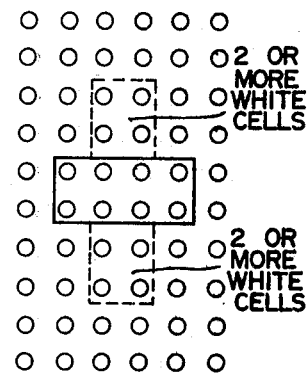
FIG. 9f

HAND-HELD SCAN DATA HANDLING SYSTEM

This is a continuation of application Ser. No. 431,376, filed Jan. 7, 1974, now abandoned.

FIELD OF THE INVENTION

This invention relates to a system and method for optical character recognition of merchandise labels at point of sale. In a more specific aspect, the invention relates to a scanning system for manual sweep of a scan head over alphanumeric data fields and automatic input thereof to a dispensing inventory system.

DESCRIPTION OF THE PRIOR ART

Systems for automatically reading alphanumeric data have been developed for various uses. However, in general the systems are large and complex. In large measure they are of the type through which documents of various sizes are passed, with the documents moving through a reading zone. The scanned field is then converted into either analog or digital form, and processed to identify the characters occupying the scanned field.

In such systems, registration between the scanning system and the document can be controlled. Control of both the document and the scan head minimizes reading problems.

In merchandising operations, a goal is the realization of a system which comprises a hand-held wand to scan data fields on merchandise or tags, and which automatically feeds into accounting and inventory systems the data fully describing sales or dispensing transactions. Because of the variations in the relative movement between the scan unit and the data field as well as misregistrations, skew and the like, the use of a hand-held and hand-operated wand multiplies the problems involved in recognition of the data.

An optical character recognition system is provided having a hand-held wand in which a two-dimensional optical sensor produces images of each character as a set of electrical signals during horizontal relative movement between the wand and a character field. An analog-to-digital converter quantizes the electrical signals into multibit digital electrical signals which are thresholded to produce 1 bit binary codes indicating black cells and white cells. According to the invention, the binary codes are combined to form character images of any character in the field based upon a plurality of black segments and white voids. Recognition is attempted a plurality of times in each interval required for movement of the sensor a distance less than one resolution element of the array while simulating vertical movement of the wand relative to the field. The segments and voids are decoded to signal presence of any character of interest.

In a further aspect, means for provided to enable system output utilization of signals from the deciding means only after K consecutive frames in which no character recognition has occurred to avoid producing multiple output indications of the same character. Further, the combining means preferably includes an array of nine serial-input parallel-output converters of which one is eight bits wide and one bit high while the other eight are one bit wide and sixteen bits high to simulate the apparent vertical movement of any character image through the array in one cell height increments to accommodate vertical character misregistration between the sensor and characters in the field.

The means for decoding the character image includes horizontally related logical OR circuits in the segment and void detection circuit to allow wide positional and angular variation in each black segment and in specified white voids.

DESCRIPTION OF THE DRAWINGS

For a more complete understanding of the present invention and for further objects and advantages thereof, reference may now be had to the following description taken in conjunction with the accompanying drawings in which:

FIGS. 9a–9f illustrate various segments and voids employed in combination logic for identification purposes.

DESCRIPTION OF THE PREFERRED EMBODIMENT

FIGURE 1

Figure 1:
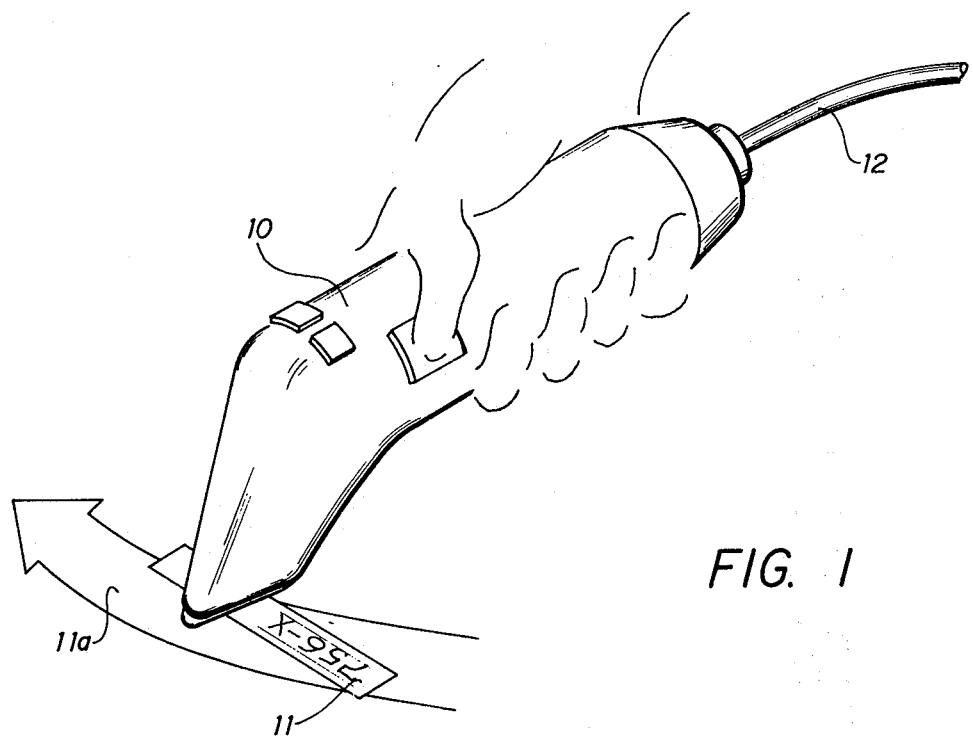
FIG. 1 is a perspective view of the hand-held wand in operation.

In FIG. 1, a hand-held wand 10 is provided for movement across a data field such as a tag 11 as along path 11a. Wand 10 has an aperture through which light passes to illuminate the tag 11 in order that the tag 11 may be viewed by an optical system. The wand 10 is connected by way of cable 12 to a processing unit which serves to identify alphanumeric data on tag 11.

It will be recognized that the sweep of wand 10 across the tag 11 may not be at a uniform velocity, and may follow a non-linear path 11a which does not correspond with the lines of data printed on tag 11. Further, the aperture in wand 10 may be skewed during all or part of its course across tag 11.

The present invention is directed to provision of reliable automatic reading of printed data such as that on tag 11, even though all of the problems introduced by variable velocity, skew, depth of field, and cross track sweep or misregistration by the wand are present.

Figure 2:
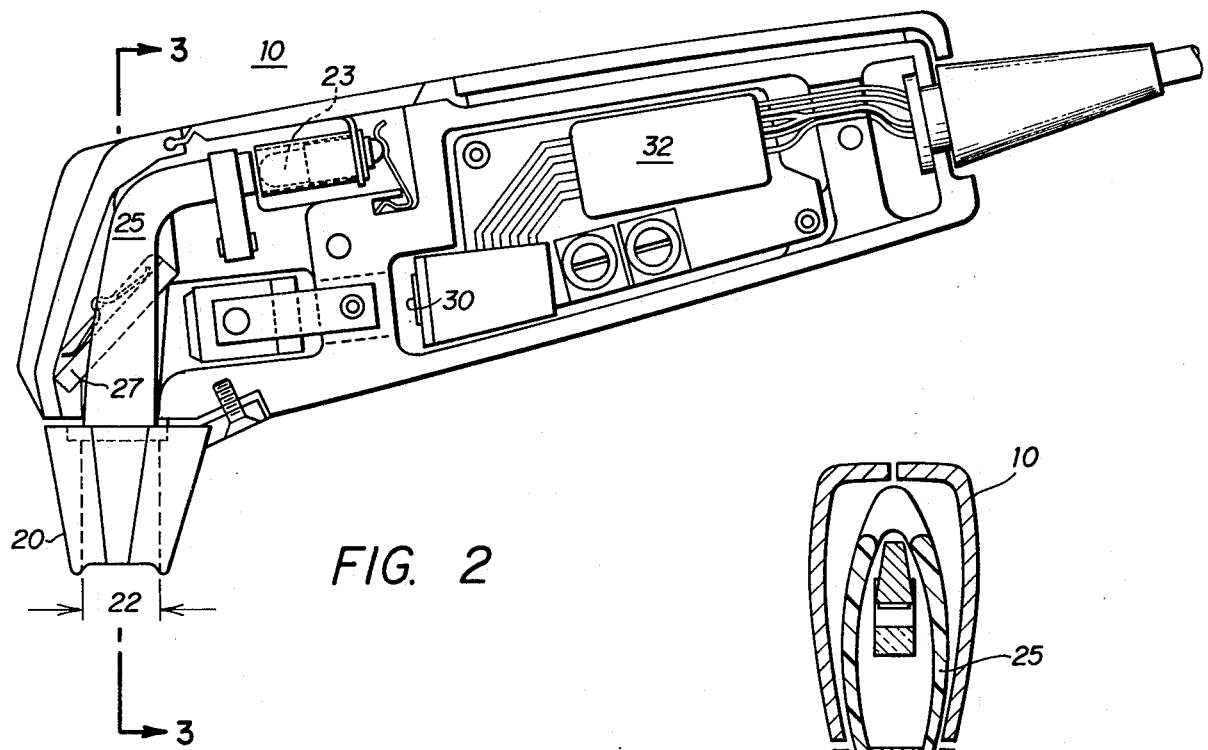
FIG. 2 is a side view of the wand of FIG. 1 with the side cover removed.
Figure 3:
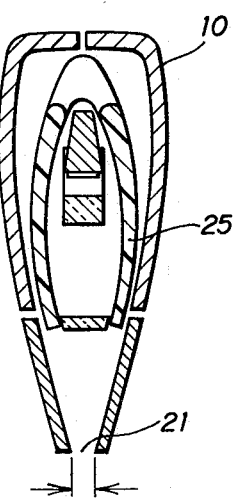
FIG. 3 is a sectional view taken along line 3—3 of FIG. 2.

FIGS. 2 and 3

One embodiment of the wand is illustrated in FIGS. 2 and 3. In this embodiment the wand tip 20 is provided with an aperture 21, FIG. 3. Aperture 21 normally would extend the width of a numeral or character to be read. The height 22 of the aperture would span several times the normal height of the characters to be read. A lamp 23 is mounted in the upper portion of wand 10 with suitable optical means such as fiber optic member 25 directing light through the aperture onto the field to be viewed. The image in aperture 21 is then reflected by a mirror 27 onto a two-dimensional, monolithic self-scanned large size integrated circuit photodiode array 30. Array 30 is then connected by way of circuitry 32 and cable 12 to processing units.

Figure 4:
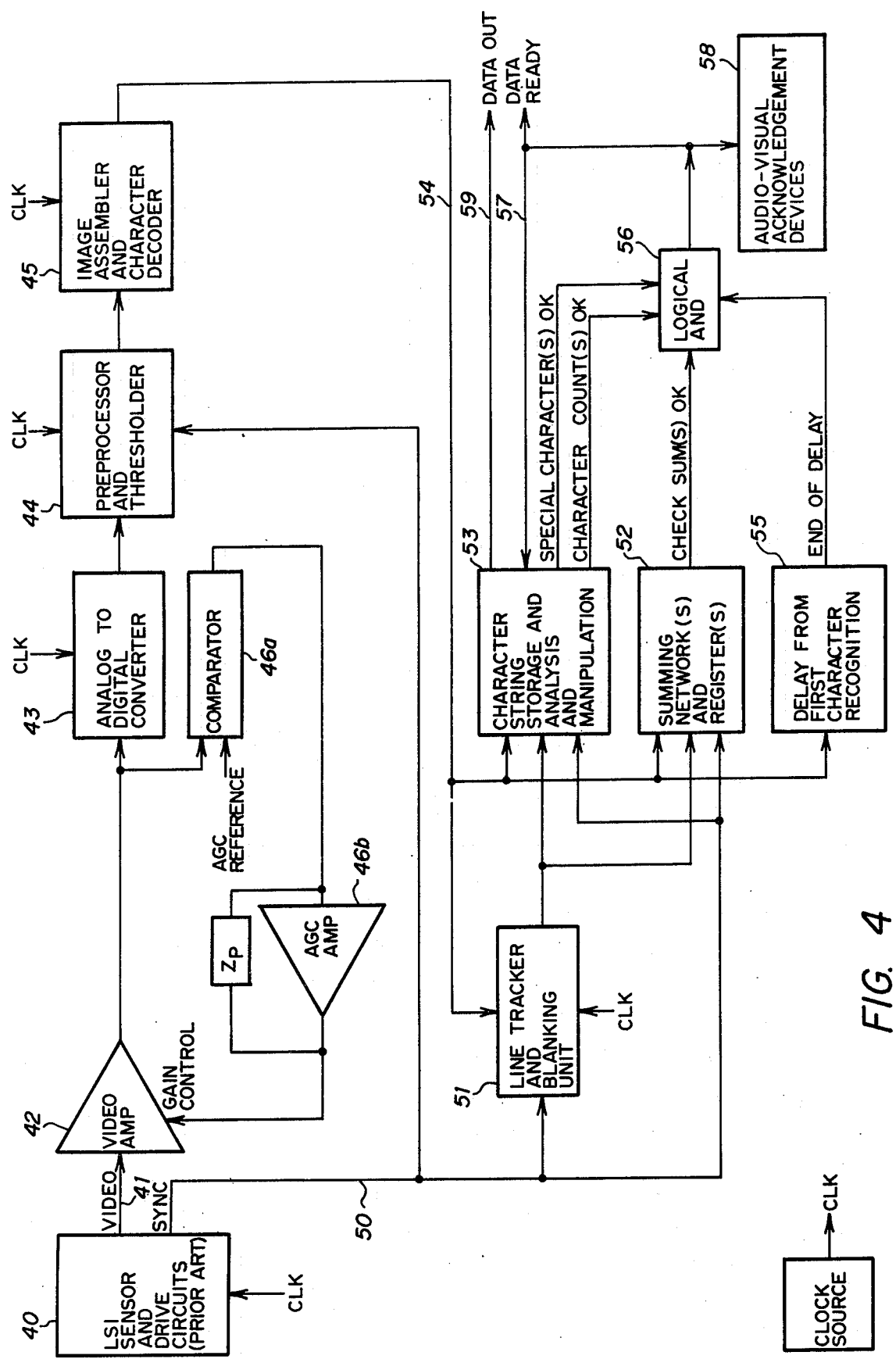
FIG. 4 is a block diagram of the wand system.
Figure 5:
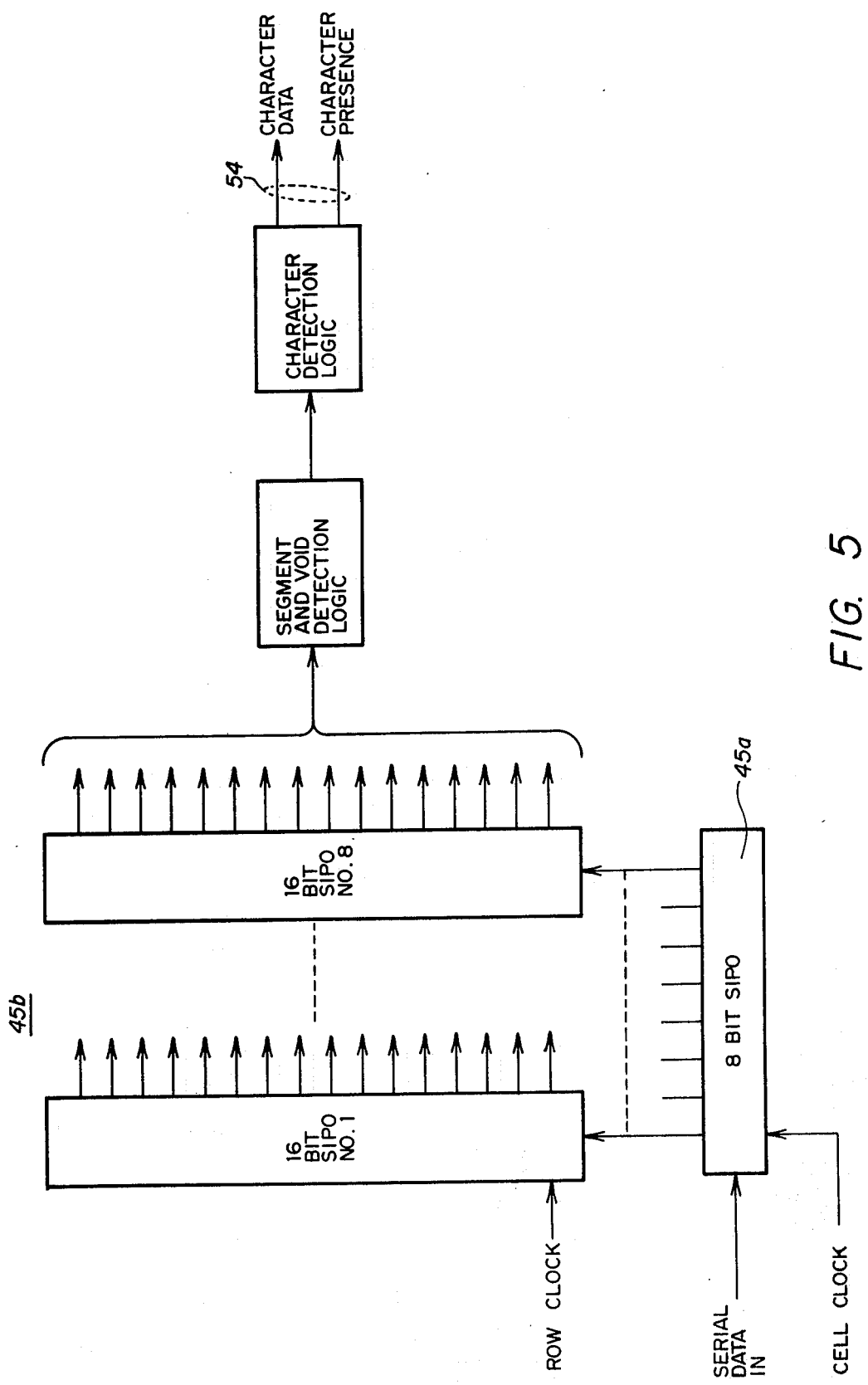
FIG. 5 is a block diagram showing the image assembler and character decoder in an expanded form.

FIGS. 4 and 5

FIG. 4 illustrates in block form one embodiment of the present invention. In this system, unit 40 represents the self-scanned array 30 of FIG. 3 and the drive circuit therefor. A line 41 extends from unit 40 by way of a video amplifier 42 to an analog-to-digital converter 43.

Video amplification includes a gain control circuit which performs a dynamic image data correlation function. The amplified video signal and a constant AGC reference are compared in a comparator 46a. The output of said comparator drives an AGC amplifier 46b with a time constant of the order of several frame scanning periods. This time constant results in the amplified video signal being normalized to a nearly constant average value for a wide range of document background reflectivities. Since the total area covered by character strokes is much less than the area of the field of view, the presence or absence of character strokes within the field of view of the sensor has only a minor effect on the gain setting. The resultant narrow range of the average amplified video signal allows a reduced range capacity in the analog-to-digital converter, preprocessing, and thresholding circuits. After amplification the analog video signal is converted to digital form by the analog-to-digital converter 43. Digital video information is sent to the preprocessor and thresholder circuits 44. The functions of these circuits are the enhancement and further correlation of the data, and the thresholding of the data to a black or white binary quantity. The thresholded data enters the Image Assembler 45 in the form of serial data corresponding to eight black or white points (cells) along a line passing horizontally through the image. Eight bits are shifted into a serial-to-parallel converter (SIPO) 45a, FIG. 5. Then the data on each said parallel output is clocked into the serial input of one of eight 16-bit serial-to-parallel converters 45b. Serial data corresponding to an adjacent line through the image is then clocked into the eight bit SIPO 45a, and the above process continually repeated. The contents of the eight 16-bit SIPO's 45b may be visualized as a 16 cell high, eight cell wide, enhanced and thresholded portion of the image within the field of view of the sensor. Decoding circuitry attached to the parallel outputs of the SIPO array detects character stroke segments, and void or all-white regions. The correct combination of stroke segments and voids constitutes the decoding of a character. The scanning and SIPO clocking technique result in the apparent vertical movement of the entire image, or frame, through the SIPO array image assembler in one cell width increments. Apparent horizontal motion of the image through the image assembler is due to motion of the hand-held sensing unit across the subject. In a preferred embodiment with a frame rate of 3500 per second and a sweep velocity of 45 centimeters per second, the scanner sweeps $45 \div 3500 = 0.13$ millimeters per frame, or about half the thickness of a character stroke. With a sensor length of 64 cells, the image is clocked vertically through the image assembler at a rate of $64 \times 3500 = 224$ kilohertz, which allows over 4 microseconds for the settling of the character decode logic. This speed allows use of metal oxide semiconductor LSI for the character decode logic and most of the image assembler.

Character skew is allowed by use of logical ORs in the character decode logic. Since an entire frame is clocked vertically through the image assembler, vertical character registration is not important to the character decoder so long as the entire character is within the optical field of view.

Line 50, FIG. 4, leading from unit 40 provides a sync pulse to unit 44. Line 50 is also connected to a line tracker and blanking circuit 51, to a summing network and register 52 and to a character string storage unit 53. The output of unit 45 is connected by way of line 54 to units 52 and 53, and to a delay unit 55. Units 52, 53 and 55 are connected to a logic circuit 56. Ouput line 57 leading from unit 56 is connected to a confirmation unnit 58 which will provide a signal acknowledging a successful reading of a given string of characters. Line 59 of unit 53 may be connected to a system such as inventory control, point of sale terminals, and similar systems to utilize the results of a scanning operation.

To allow line following, the vertical positioning of a character is allowed to differ by a small amount $\Delta V$ from the previous character in a given line. Thus, a line may begin at one extremity of the field of view and be tracked gradually across the field of view to the opposite extremity. This capability is required for human swept scanning in a loosely constrained environment such as the point of sale. The line tracking circuit 51 is a counter and logic which provides a binary number $V_c$ corresponding to the vertical position of the character in the field of view. Each of a plurality of character string storage registers 53 is identified by binary number $V_n$ corresponding to the vertical positioning of the last character detected for that character string. Upon detection of a character, said binary number $V_c$ is compared with the binary numbers $V_n$ identifying the existing character strings. Where $\Delta V = |V_n - V_c|$, and $\Delta V$ is less than approximately one-half of the height of a character, the new character is added to the character string.

Because each character may be recognized in more than one snapshot, a blanking circuit 51 is required to avoid multiple loading of a given character into a character string register 53.

For the application of reading more than one line at a time, each character string register must have its own blanking circuit. The preferred embodiment is a down-counter which is reset to a constant K whenever a character is recognized. The down-counter count input is the end-of-frame sync. When the down-counter counts down to zero, K frames have been searched with no character being recognized. This constitutes a decision that the sweeping motion has moved the latest character out of the field of character recognition. The loading of a character into a character string register is enabled only when the down-counter identified with said register is in a zero count state. Character strings are analyzed for special character content in unit 53. The location within the string of a special character reveals the direction of manual sweep of the wand. The special character reveals the significance of the character string, and reveals how many characters are needed to satisfy the fixed field length requirement. The length of the character string is examined for compliance with the field length requirement. For custom LSI implementation of this function, full parallel logic may perform the preceding storage and analyses. For low volume production, a general purpose microprocessor is sufficient. Checksum acceptability for a character string is calculated by arithmetic networks and registers in a conventional manner in unit 52.

For limited length data fields, a fixed time interval is initiated in unit 55 by the detection of the first character. At the end of the interval, the checksum, special character, and character count acceptability outputs are logically ANDed in unit 56. If any is unacceptable, the system is cleared for another manual scan. If all are acceptable, an audio-visual indication of success is given to the operator by unit 58, a "data ready" signal is sent through line 57 to the external data processing or other system, and the character string storage registers are enabled to transmit the data in the proper order. In lieu of the fixed delay period, a delay of the order of 200 milliseconds is initiated or reinitiated by unit 55 upon detection of any character. A period exceeding the delay period without a character recognition occurring, constitutes the "end of data field" decision.

FIGS. 6–8 and 10–13 show one embodiment of the system of FIG. 4. Before turning to details of the construction of the various elements which in FIG. 4 are shown in block form, it will be helpful to keep in mind that the present description involves the use of an LSI integrated circuit photodiode array having a matrix of 32 × 32 photodiodes on 100 micrometer centers. Only a portion of this array will be used, namely a portion 6 cells wide and 32 cells high. The particular photodiode array that will be here described was of the type manufactured by Reticon Corporation, Mountain View, Cal., and identified as RA 32 × 32 Self Scanned Photodiode Array.

FIG. 6

Figure 6:
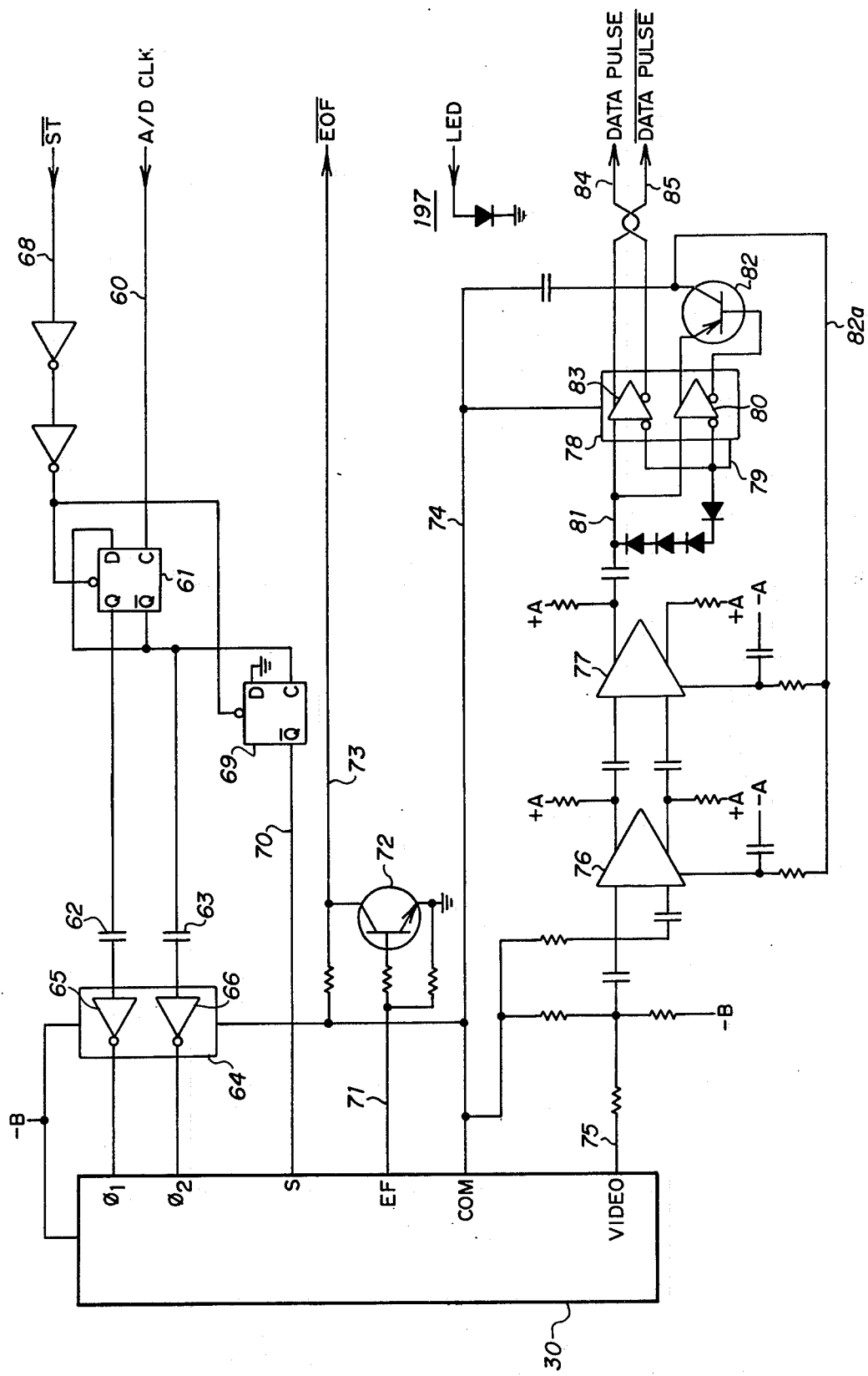
FIGS. 6, 7, 8, 10, 11, 12, and 13 are detailed circuit diagrams of a simplified version of the system of FIG. 4.

FIG. 6 includes the photodiode array 30, FIG. 2, shown in block form with the drive circuits and output amplifier-gain control provisions connected thereto. A clock line 60 leads by way of a D type flip-flop 61 to the clock input of array 30. The Q and $\overline{Q}$ outputs of flip-flop 61 are connected by way of capacitors 62 and 63 to the clock driver unit 64 which includes a pair of inverters 65 and 66 to drive array 30. Line 68 is connected to the preset terminal of flip-flop 61 as well as to preset terminal of a second flip-flop 69. The $\overline{Q}$ output of flip-flop 61 is connected to the clock input terminal of flip-flop 69. The $\overline{Q}$ output of flip-flop 69 is connected by line 70 to the start input terminal of the array 30. Line 71 leads from the array 30 by way of a transistor 72 to a line 73 to provide an end of frame sync pulse. Line 74 is the common power connection leading to array 30. Line 75 is the video signal output line. The video signal is passed by way of amplifier modules 76 and 77 to a dual comparator 78. Unit 78 is of conventional known construction providing a reference voltage on output line 79. The unit 80 in comparator 78 compares the signal voltage on line 81 with the reference voltage on line 79. If the signal voltage exceeds the reference voltage, transistor 82 with output line 82a is turned on, thereby reducing the gain in amplifiers 76 and 77.

Unit 83 compares the voltage on line 81 with the reference voltage on line 79. By this means there are produced on output lines 84 and 85 complementary voltage states which indicated the absence or presence of data pulses. A data pulse indicates that a given cell in unit 30 as viewed was white or was background. Absence of the data pulse indicates that the area viewed by a given cell in unit 30 was black. The gain control circuit including transistor 82 operates with the array 30 most of the time during the viewing of the white background. The transistor 82 will be just barely conducting on a white background.

The gain control circuit has a relatively long time constant, of the order of several frame periods. Thus, when a given photocell in unit 30 views a black area, the threshold will not be exceeded and line 84 will be low with line 85 high. This indicates no data pulse or a black area.

FIG. 7

Figure 7:
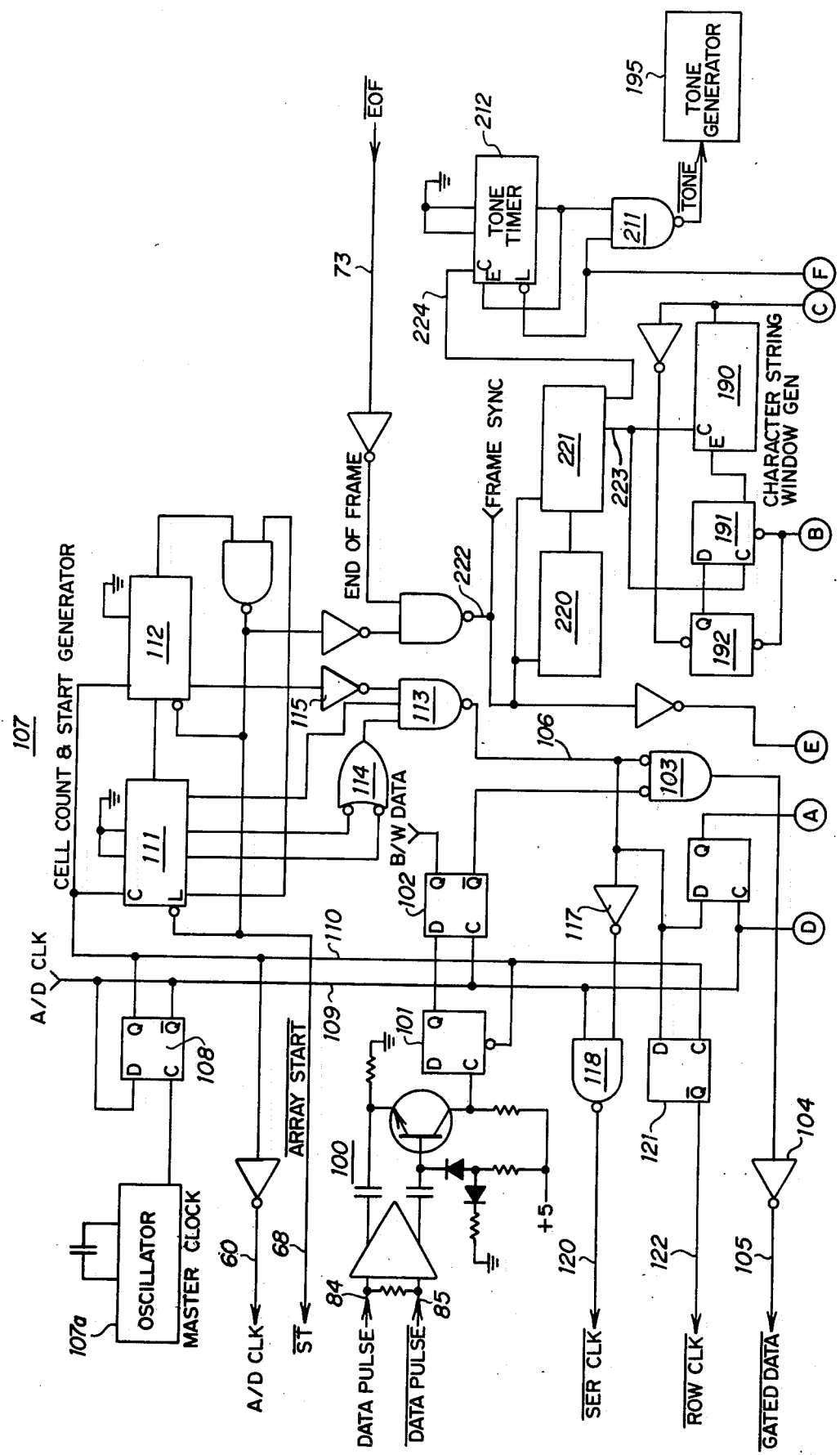

Referring now to FIG. 7, the data lines 84 and 85 are terminated in a line receiver and level shifter circuit 100. The output of the circuit 100 is applied to a D flip-flop 101 whose Q output is connected to the input of a flip-flop 102. Thus the black/white data appears on the Q and $\overline{Q}$ outputs of flip-flop 102. The $\overline{Q}$ output is connected by way of a NOR gate 103 and inverter 104 to a gated data line 105.

The second input to NOR gate 103 is supplied by line 106 from a cell count and start generator unit 107. A gate voltage on line 106 serves to enable NOR gate 103 only during the scan of the fraction of the cells of array 30, i.e., six cells wide, that are to be used in each row. The remainder of the scan period is not utilized.

This embodiment includes such gating for the sole reason that a 32 × 32 array is presently available and found to be satisfactory. As arrays of dimension 6 × 32 or the like become available, then the circuitry shown herein would be somewhat simplified, and all of the elements of the array would be used. However, in the present case the control of NOR gate 103 by way of line 106 is provided from the master clock unit 107a, which feeds a flip-flop 108 to provide clock pulses on lines 109 and 110. Line 110 is connected to counters 111 and 112 which are cascaded to provide various control and timing pulses hereinafter noted. Line 106 is connected from NAND gate 113 which is fed from units 111 and 112 by way of NAND gate 114 and inverter 115, respectively.

Line 106 is connected by way of an inverter 117 to a NAND gate 118, the second input of which is supplied by way of line 109 to provide on line 120 a $\overline{\text{serial clock}}$ pulse.

Line 110 is connected by way of flip-flop 121 to a $\overline{\text{row clock line}}$ 122. The data input terminal of flip-flop 121 is connected to line 106. In this embodiment, one pulse will appear on line 122 for every six pulses appearing on line 120.

FIG. 8

Figure 8:
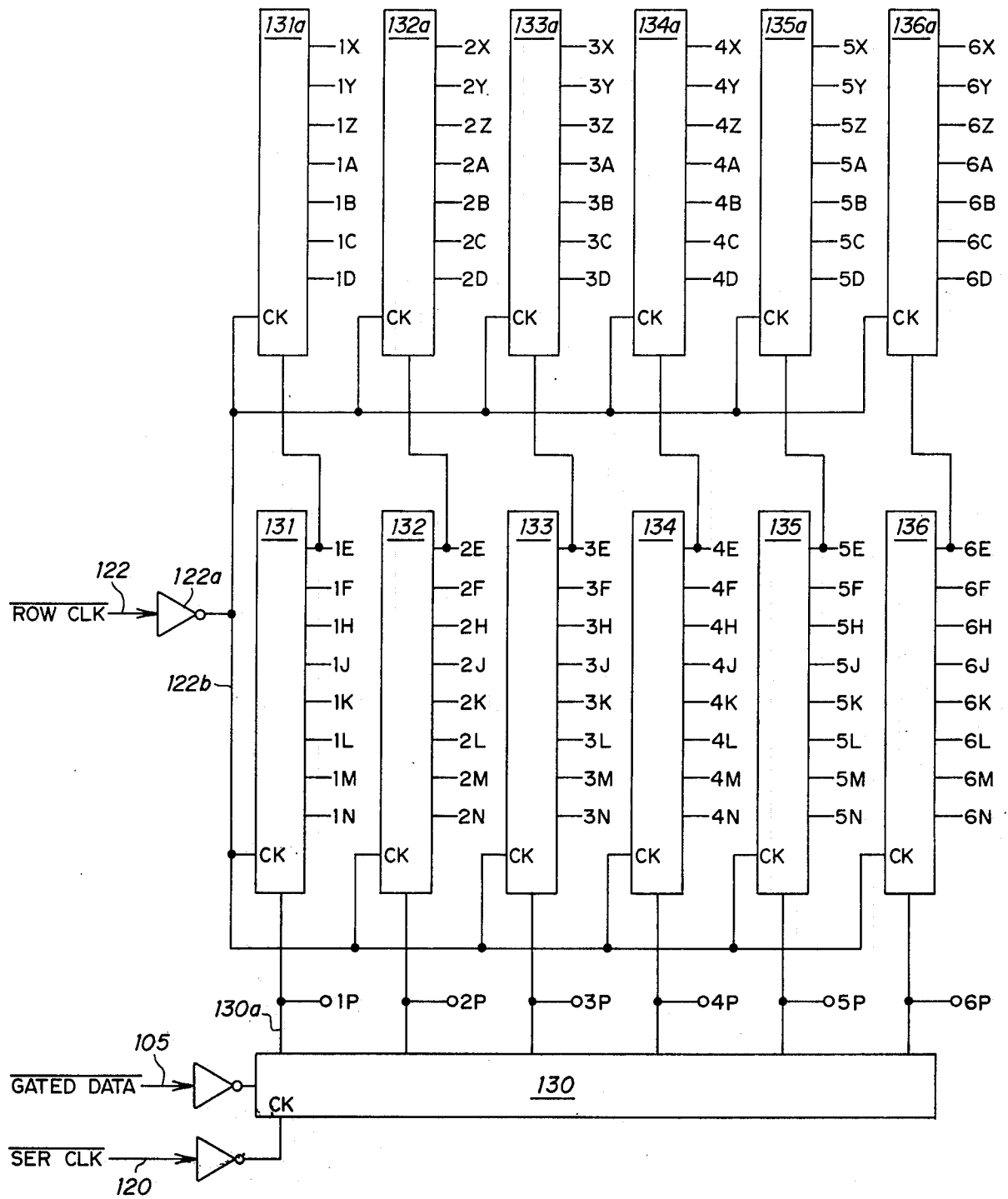

Lines 105, 120 and 122, FIG. 7, are connected to a set of shift registers illustrated in FIG. 8. In FIG. 8, line 105 is connected to the data input terminal of a 6 bit serial input, parallel output shift register 130. The serial clock line 120 is connected to the clock input of register 130.

The six output lines from register 130 are connected to the input lines of six serial input, parallel output shift registers 131–136. Register 131 is connected at its last output terminal 1E to the input to a similar shift register 131a. Similarly, shift registers 132–136 are connected to shift registers 132a–136a. Registers 131–136 and 131a–136a are each 8 bit registers, but only a portion of the outputs are employed. The outputs are labeled, for example, 1X, 1Y, 1Z, 1A–1N for registers 131 and 131a. Similarly, registers 132 and 132a have outputs labeled 2X, 2Y, 2Z, 2A–2N. Registers 133–136 and 133a–136a are similarly labeled and are similarly employed.

With serial clock pulses appearing on line 120 and row clock pulses appearing on line 122, the data on line 105 is clocked into register 130 in synchronism with the scan of a row of photodiodes in array 30, FIG. 6. The row clock pulse line 122 is connected by way of inverter 122a and line 122b to the clock input terminal of all of the shift registers 131–136a. Thus, at the occurrence of any given row clock pulse, there may be captured in the registers 131–136a a set of binary bits which will describe the presence of a character viewed by the array 30.

The outputs 1X-6N, 1P-6P, so labeled in FIG. 8, are then applied to logic networks which combine to detect the presence of character segments in certain predetermined areas of the field viewed by the array 30, and also to detect voids between character portions of the field veiwed by array 30. Binary signals representing the character segments and character voids are combined logically to provide an identification of the presence of each of the given characters that may be present in the field. Particular segments and voids that have been found to be particularly useful in permitting accurate identification of alphanumeric characters are shown in FIGS. 9a–9f.

FIGS. 9a–9f

FIG. 9a segments are labeled Seg A, Seg B, Seg C, Seg D. Seg E, Seg F and Seg J. Points corresponding to locations of cells in the 6 × 32 array employed herein are designated by coordinates wherein columns are labeled by numerals 1, 2, 3, etc., and rows of characters A, B, C, etc. Seg A, for example, includes six cells, namely cells 1B and 2B, 1C and 2C, 1D and 2D in an array of cells which is six cells wide and 10 cells high. In contrast, Seg F includes cells 9B, C, D and E and 10B, C, D and E.

The logic employed is such that for the segment A to be indicated present, at least one cell in each of the three pairs of cells must be black. Cells 1B and 2B are ORed together as are cells 1C and 2C, and as are cells 1D and 2D. The OR outputs are then ANDed. Requirements for defining the segments of FIG. 9a will be best understood by referring to the logic diagrams later to be explained in connection with FIG. 10. However, before turning to FIG. 10, it should be noted that in addition to detecting the presence of segments as in FIG. 9a, a set of voids are detected. The voids employed are primarily illustrated by FIG. 9b, and are outlined in connection with a matrix 6 bits wide and 16 bits high. The voids in FIG. 9b are characterized as voids 1-8, 11, 12, 13 and BRACKET. Voids are so connected by way of logic that in order for the circuitry to indicate the presence of a void, all of the cells within the given area must be white. An exception, however, is that void 12 allows cells pairs to be ORed for white output and the ORed outputs to be then ANDed. Both void 13 and void S will be indicated present if all eight cells in the central void and one or two of the two cells above the central void and one or two of the cells below the central void are white.

FIG. 9c illustrates Seg K and Seg F together with voids 14 and 15 employed to sense the numeral 1.

FIG. 9d illustrates void 12 employed to sense the numeral 4.

Seg H occupies a significant location in the array. Thus, the logic employed imposes further limitations before the presence of Seg H will be indicated. These limitations are in the alternative and are illustrated by FIGS. 9c and 9f. In FIG. 9e if the condition is satisfied that at least one of each of the three pairs of cells within the solid rectangle is back and two cells above and two cells below the solid rectangle as indicated in the dotted outline are all white, then a Seg H will be indicated.

In FIG. 9f if at least one of each of the four pairs of cells in the solid outline is black and if two or more of the four cells in the dotted outline above the solid black outline and two or more of the four cells in the dotted outline below the solid black outline are white, then Seg H will be indicated.

Figure 10:
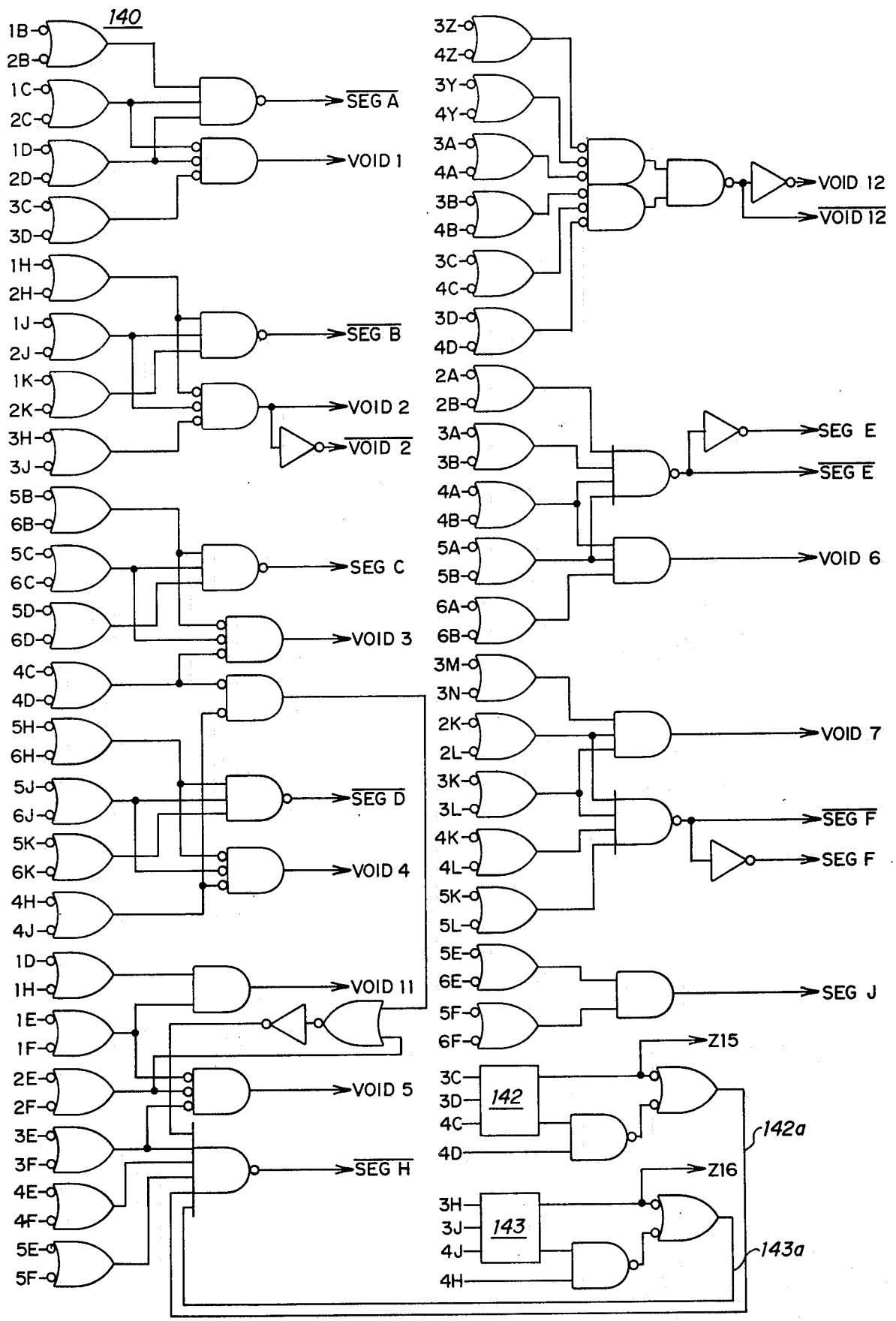
Figure 11:
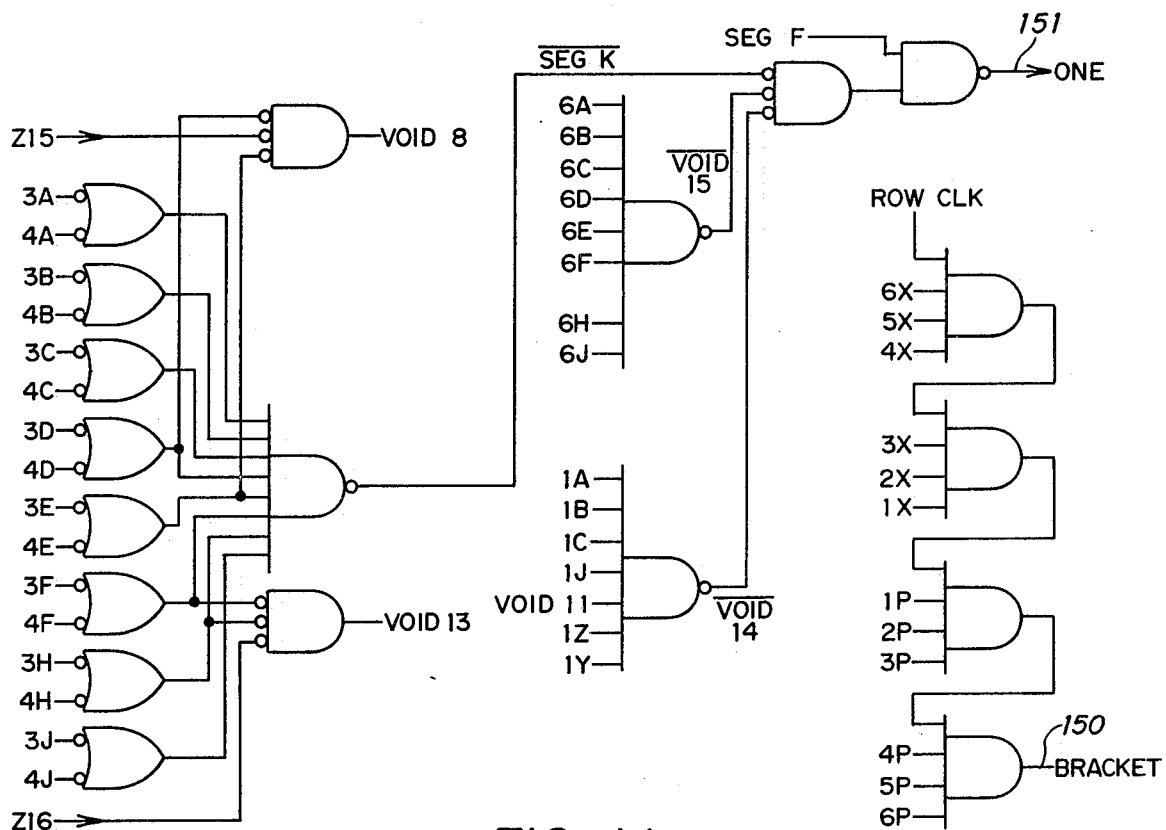
Figure 12:
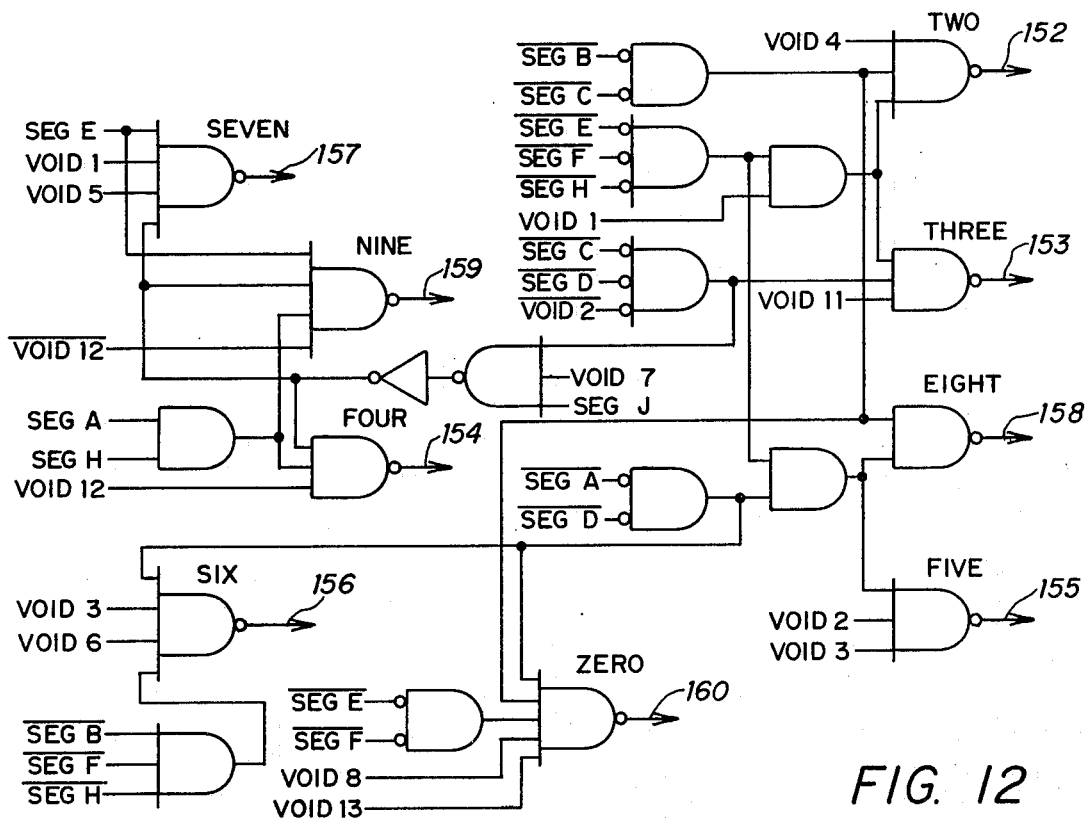

FIGS. 10 and 11

Logic for utilizing the data from FIG. 8 to carry out the logical decision for identification of the alphanumeric data represented by states in the shift registers of FIG. 8 is shown in FIGS. 10 and 11.

In FIG. 10, the input terminals to an input bank 140 of logic elements are labeled to correspond with the output lines leading from the shift registers 131–136a of FIG. 8. In the order in which they appear on FIG. 10, the presence of segments and the presence of voids will be indicated by the output lines being high or true. The absence of a segment or the absence of a void will be indicated by the output line being low or false. The logic outputs labeled in FIG. 10 are thus produced by the combinational logic illustrated through the use of symbols, the identify and meaning of which is clear, except for the fact that two adder units 142 and 143 are employed in the determination of the validity of the set of FIG. 9f. There appears on the output line 142a a one state if two or more of the four cells 3C, 3D, 4C and 4D are white. Similarly, there appears on line 143a a one state if two or more of the four imput lines 3H, 3J, 4J and 4H are white.

With the logic circuit connected as shown in FIGS. 10 and 11, there will be produced on output line 151, FIG. 11, a low or false state if the character represented by the states in the shift register of FIG. 8 is a one. There will be produced on line 150 a true or high state if brackets have been found to be present. The additional numerals 2–9 and 0 will be indicated by low states on output lines 152–160 of FIG. 12. The output lines 150–160 are then connected to the logic circuitry shown in FIG. 13.

While the foregoing description has been limited to the identification of numerals 1–9, 0 and a bracket, it will be apparent that similar logic networks can be provided for identifying uniquely the letters of the alphabet.

FIG. 13

Figure 13:
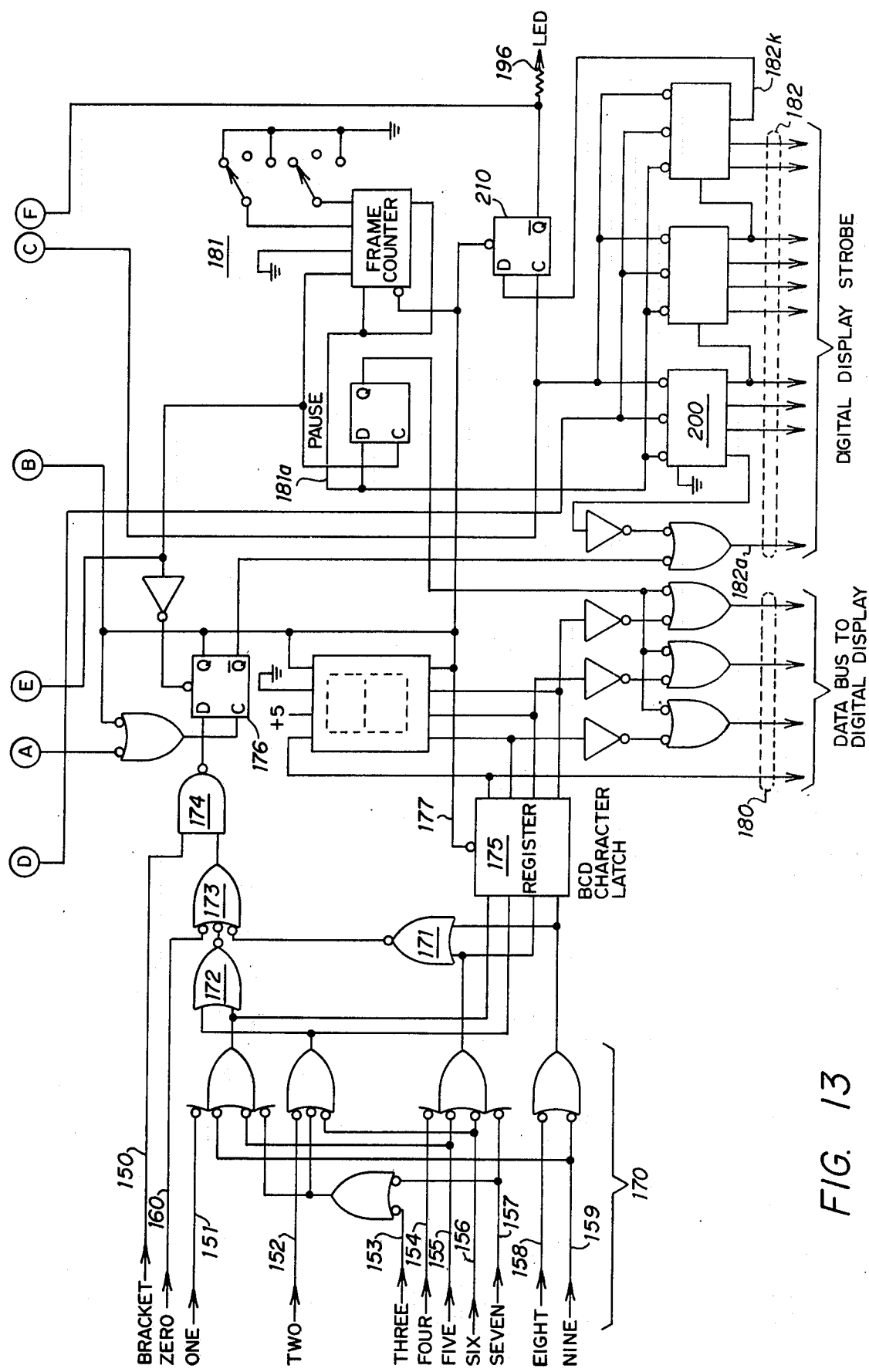

In FIG. 13, 10 data lines 151–160 and a "bracket" line 150 denote a character and a continuous void immediately above and below the character. The character is encoded into Binary Coded Decimal (BCD) by the logic network 170. The 10 data lines are ORed together by units 171–173, then ANDed in unit 174 with the bracket signal on line 150 to cause the BCD to latch into a register 175 via a flip-flop 176. The latch enable state on line 177 occurs after the outputs of the character recognition logic of FIGS. 10–12 have settled.

The latched BCD data is then applied by bus 180 to 10 digital display devices, the number 10 being assumed for purposes of this description and not as a limitation. A counter 181 counts frames which have been scanned with no character being recognized. At the end of eight consecutive such frames, the BCD data on lines 180 is strobed into one of the digital numeric display devices by a state appearing on one of lines 182.

When the first of a string of characters is recognized, a time interval of the order of 600 milliseconds is initiated in units 190–192 of FIG. 7. At the end of this interval, if exactly 10 characters have been recognized, a short audible tone is generated by a unit 195, FIG. 7, and a line 196 is energized leading to a light omitting diode 197, FIG. 6, located on the hand-held wand to indicate a "good read" to the operator.

A second embodiment of the function provided by counters 190–192 is the initiation or re-initiation of a time interval of the order of 100 milliseconds each time a character is recognized. If the time interval lapses without re-initiation, and exactly ten characters have been recognized, the audible tone is generated and the light emitting diode is illuminated.

Lines 182, FIG. 13, lead from an eleven bit shift register 200. All of the output lines 182 initially are set at one except the first output line 182a. The shift register 200 operates in response to the output of counter 181 to shift the zero on the first output line 182 successively to each of the additional output lines through output line 182k. The counter 181 counts noncharacter frames for the purpose of generating a strobe pulse on output line 181a. This output line is then connected to the clock input of shift register 200. The counter 181 provides an output on line 181a each time the counter completes its cycle of m counts. In one embodiment the counter 181 counted eight consecutive frames without a character recognition occurring. The purpose for such operation is to be certain that the same character is not recognized more than once during a given sweep of the wand across the data field. Thus, the output of the counter 181 shifts to zero initially on line 182a and finally to the last output line 182k. Line 182k then is connected to the data input of a flip-flop 210. The Q output of flip-flop 210 is then connected to line 196 and also enables NAND gate 211 of FIG. 7, initiating a time interval by the tone timer 212. Thus, the tone generator 195 will be activated for the period determined by timer 212. Counters 220 and 221, FIG. 7, count down the clock signal on line 222 so that pulses will appear at the output lines 223 and 224 at relatively low rates, adequate for operation of tone timers 212 and of the character string window generator 190–192. For example, the input pulse rate on line 22 is of the order of 2 to 4 kilohertz. The output on line 224 is divided down by a factor of 256. The signal on line 223 is divided down by a factor of 128.

The specific embodiment in the foregoing description involves focusing a field to be read onto a two-dimensional, self-scanned photodiode array; converting the video signal to digital form; thresholding the digital data to black or white binary quantities; storing the binary quantities in a register of array width and greater than character height; analyzing the register contents to sense black segments and white voids; and uniquely combining the segments and voids for character recognition.

Certain aspects of the scanning-recognition operation described herein are described and claimed in copending application Ser. No. 462,742, filed Apr. 22, 1974.

The operations described herein involving the simulation of vertical movement in connection with scanning and recognition of characters is described and claimed in copending application Ser. No. 462,743, filed Apr. 22, 1974.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A method for optically reading and automatically processing alphanumeric data utilizing a hand-held wand, which comprises the steps of:
   passing a two-dimensional array of photosensitive elements horizontally along a line of data to be read,
   focusing an optical image of the data upon said array,
   digitizing the output signals produced by said array,
   thresholding said digitized outputs to produce a 1 bit binary code indicating black data cells and white data cells,
   storing said binary codes in registers to form a plurality of character images,
   shifting the binary codes in the register to simulate vertical movement of said array relative to the line,
   combining the binary codes indicating black cells the binary codes indicating white cells to provide an identification of the presence of a character image along the line, and
   processing the character images for character recognition at intervals related to the time required for movement of the array a preset distance along the line for each simulated increment of vertical movement.

2. The method for optically reading as set forth in claim 1 including the step of establishing a predetermined restraint condition for inhibiting plural output indications from any character the image of which is captured.

3. An optical character recognition system utilizing a hand-held wand for optically reading alphanumeric characters on a character field and automatically processing and transmitting the data to receiver and/or display devices, which comprises:
   a two-dimensional photo sensor array of height in cells greater than the array width in cells to produce optical images of each character as a set of electrical signals during horizontal relative movement between said wand and said field,
   means responsive to the electrical signals to produce one bit binary codes representing an image,
   means for storing the one bit binary codes as character segments and background segments,
   a blanking circuit means to inhibit multiple loading of a single character into said means for storing upon operating of the hand-held wand at a high frame rate and a low hand-swept velocity, and
   a line tracker circuit to sense vertical positioning of a character image on said array and to separate character strings which correspond with multiple lines of characters in the field of view of said sensor.

4. A hand-held operated character recognition system as set forth in claim 3 including a character string and storage analysis circuit to analyze nonnumeric characters in a character string to thereby accommodate sensing multiple data field.

5. The combination as set forth in claim 4 wherein said blanking circuit includes a down counter which is reset to a constant k whenever a character is recognized, where K corresponds to frames searched with no character being recognized.

6. The combination as set forth in claim 5 wherein a character is loaded into said character string and storage analysis circuit when the down counter identified with said circuit is in a zero count state.

7. The combination as set forth in claim 4 wherein:
said character string and storage analysis circuit includes a plurality of character string storage registers, and
said line tracker circuit means includes a counter and logic unit which provides a binary number VC corresponding to the vertical position of the character in the field of view, and includes means to identify each of said plurality of character string storage registers by binary number VN corresponding to the vertical positioning of the last character detected for that string, and includes means for determining whether a detected character is to be added to a given string by determining whether VN - VC is less than approximately one-half of the height of a character.

8. The combination as set forth in claim 3 including a counter for counting the number of characters recognized during one sweep across said field.

9. The combination as set forth in claim 3 including means for limit recognition of only a predetermined number of characters in a given sweep across said field.

10. The combination as set forth in claim 3 including means for establishing a time interval within which to recognize the first character during a given sweep across said field.

11. The combination as set forth in claim 3 including means responsive to the end of an initiated time interval to evaluate special character and character count acceptability to indicate success of a given sweep across said field.

12. The combination as set forth in claim 3 including means for setting a delay time and wherein a period exceeding the delay time without a character recognition occurring indicates the end of a character field.

13. An optical character recognition system utilizing a hand-held wand for optically reading alphanumeric characters on a character field and automatically processing and transmitting the data to receiver and/or display devices, which comprises:
a two dimensional optical sensor in said hand-held wand to produce optical images of each said character as a set of electrical signals indicating black cells and white cells in said field during horizontal relative movement between said wand and said field,
means responsive to the electrical signals to produce one bit binary codes indicating black cells and white cells in said field,
means for storing the black cell and white cell binary codes,
means for shifting the codes in said means for storing to simulate vertical movement of the wand relative to the field,
means for processing the black cell codes and the white cell codes to provide an identification of the presence of a character image in the field, and
means for attempting an identification of a character image between the shifting of the binary codes in said means for storing from a plurality of black cell codes and a plurality of white cell codes, the interval between each attempt of identification being related to the time required for the movement of said sensor a preset distance in said field.

14. The system of claim 13 including a counter for counting the number of characters recognized during one sweep across said field.

15. The system of claim 13 including means to limit recognition of only a predetermined number of characters in a given sweep across said field.

16. The system of claim 13 wherein display or transmission means respond to said means for identification to display in real time characters in said field.

17. The system of claim 16 wherein said display or transmission means is disabled unless a predetermined key symbol is recognized at a predetermined location in said field.

18. The combination as set forth in claim 13 including means for establishing a time interval within which to recognize the first character during a given sweep across said field.

19. The combination as set forth in claim 18 including means responsive to the end of an initiated time interval to evaluate special character and character count acceptability to indicate success of a given sweep across said field.

20. The combination as set forth in claim 13 including means for setting a delay time and wherein a period exceeding the delay time without a character recognition occurring indicates the end of a character field.

21. An optical character recognition system utilizing a hand-held wand for optically reading alphanumeric characters on a character field and automatically processing and transmitting the data to receiver and/or display devices, which comprises:
a two dimensional optical sensor in said hand-held wand to produce optical images of each said character as a set of electrical signals indicating black cells and white cells in said field during horizontal relative movement between said wand and said field,
means responsive to the electrical signals to produce one bit binary codes indicating black cells and white cells in said field,
means for storing the black cell and white cell binary codes as black character segments and void segments,
means for shifting the codes in said means for storing to simulate vertical movement of the wand relative to the field,
means for combining the black segments and the void segments to provide an identification of the presence of a character image in the field, and
means for attempting an identification of a character image between the shifting of the binary codes in said means for storing from a plurality of black segments and void segments, the interval between each attempt of identification being related to the time required for the movement of said sensor a preset distance in said field.

22. The combination set forth in claim 21 in which said sensor is an LS1 photosensing array.

23. The optical character recognition system as set forth in claim 21 wherein:
said optical sensor is a two-dimensional array of photosensitive diodes, and said means for storing includes an array of nine serial-input-parallel-output registers of which one is 8 bits wide and 1 bit high while the other eight are 1 bit wide and 16 bits high to simulate the apparent vertical movement of said character image through said array in one cell height increments, and thereby accommodate vertical character misregistration between said sensor and characters in said field.

24. The combination set forth in claim 21 in which means are provided to enable system output utilization of signals from said means for identification only after K consecutive attempts in which no character recognition has occurred.

25. The combination as set forth in claim 21 wherein said means for combing said black segments and void segments includes logical OR circuits responsive to preset patterns of black segments or void segments.

26. The combination set forth in claim 21 in which said patterns comprise horizontal rows or vertical columns corresponding to subsets of said binary codes and wherein members in said horizontal rows or vertical columns are logically ORed to accommodate variations in angle, perspective and field depth during said movement across said field.

27. A hand operated optical character recognition system as set forth in claim 19 wherein a two-dimensional array of photosensitive diodes in said sensor is operated at a frame rate sufficiently high to preclude passage of a character past the field of view without the character being centered within the tolerance of the said system during at least one frame thereby to accommodate variable sweep velocity, variable character pitch and unknown direction of sweep and including:
   a blanking circuit means to inhibit multiple loading of a single character in said means for storing upon operating at a high frame rate and at low hand-swept velocity,
   a character string and storage analysis circuit means to analyze nonnumeric characters in a character string thereby to accommodate sensing multiple data fields, and
   a line tracker circuit means to sense vertical positioning of a character image on said array and to separate character strings which correspond with multiple lines of characters in the field of view of said sensor.

28. The combination as set forth in claim 27 wherein said blanking circuit includes a down counter which is reset to a constant K whenever a character is recognized, where K corresponds to frames searched with no character being recognized.

29. The combination of claim 27 wherein K is about 14.

30. The combination set forth in claim 27 wherein:
   said character string and storage analysis circuit means includes a plurality of character string storage registers, and
   said line tracker circuit means includes a counter and logic unit which provides a binary number $V_c$ corresponding to the vertical position of the character in the field of view, and includes means to identify each of said plurality of character string storage registers by binary number $V_n$ corresponding to the vertical positioning of the last character detected for that string, and includes means to determine whether a detected character is to be added to a given string by determining whether $|V_n - V_c|$ is less than approximately one-half of the height of a character.

31. The combination as set forth in claim 27 including means for setting a specific time interval to be initiated upon recognition of the first character, and the expiration of said time interval constituting a decision that the scanning operation is complete.

32. The combination as set forth in claim 27 including means for setting a specific time interval to be initiated or reinitiated upon recognition of any character, and the expiration of said interval constituting a decision that the scanning operation is complete.

33. The system of claim 21 including a counter for counting the number of characters recognized during one sweep across said field.

34. The system of claim 21 including means to limit recognition of only a predetermined number of characters in a given sweep across said field.

35. The system of claim 21 wherein display or transmission means responds to said means for identification to display in real time characters in said field.

36. The system of claim 35 wherein said display or transmission means is disabled unless a predetermined key symbol is recognized at a predetermined location in said field.

* * * * *

PO-1050
(5/69)

UNITED STATES PATENT OFFICE
CERTIFICATE OF CORRECTION

Patent No. 3,964,022          Dated June 15, 1976

Inventor(s) Charles E. Martin          Page 1 of 2

It is certified that error appears in the above-identified patent and that said Letters Patent are hereby corrected as shown below:

Abstract, cancel lines 2 and 3 and substitute --Alphanumeric data is optically read and processed using a hand-held wand for passing a two-dimensional array of--.

Col. 1, line 9, after "at" insert --a--;
               after sale" insert --terminal--;
       line 10, change "manual" to --manually--;
               change "sweep" to --sweeping--;
               cancel "of";
       line 56, change "for" to --are--;
       line 57, change "deciding" to --decoding--.

Col. 3, line 55, after "3500" insert --frames--.

Col. 4, line 9, after "units" insert --51,--;
       line 12, change "unnit" to --unit--;
       line 34, change "$/V_n - V_c/$" to --$|V_n - V_c|$--.

Col. 5, line 64, change "unit" to --array--;
       line 66, change "unit" to --array--.

Col. 6, line 5, change "unit" to --array--.

Col. 7, line 57, change "cells" to --cell--;
       line 59, change "S" to --8--.

Col. 8, line 3, change "9c" to --9e--;
       line 22, change "registors" to --registers--;
       line 30, change "identify" to --identity--.

Col. 9, line 51, change "22" to --222--.

Col. 10, line 28, after "cells" insert --and--.

UNITED STATES PATENT OFFICE
CERTIFICATE OF CORRECTION

Patent No. 3,964,022     Dated June 15, 1976

Inventor(s) Charles E. Martin     Page 2 of 2

It is certified that error appears in the above-identified patent and that said Letters Patent are hereby corrected as shown below:

Col. 11, line 15, change "VC" to $--V_c--$;
line 19, change "VN" to $--V_n^c--$;
line 23, change "VN - VC" to $--|V_n - V_c|--$.

Col. 13, line 19, change "21" to -- 25 --.

Col. 14, line 6, change "27" to -- 28 --.

Signed and Sealed this

Twenty-first Day of December 1976

[SEAL]

Attest:

RUTH C. MASON
*Attesting Officer*

C. MARSHALL DANN
*Commissioner of Patents and Trademarks*